United States Patent
Praun et al.

(10) Patent No.: US 8,959,168 B2
(45) Date of Patent: Feb. 17, 2015

(54) WEATHER FORECASTS BASED ON EXPECTED LOCATION

(71) Applicant: Google Inc., Mountain View, CA (US)

(72) Inventors: Emil Praun, Union City, CA (US); James A. Guggemos, Windsor, CO (US); Gokay Baris Gultekin, Palo Alto, CA (US); Tom Carl Stamm, Louisville, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/940,439

(22) Filed: Jul. 12, 2013

(65) Prior Publication Data

US 2013/0346523 A1 Dec. 26, 2013

Related U.S. Application Data

(63) Continuation of application No. PCT/US2013/047177, filed on Jun. 21, 2013.

(60) Provisional application No. 61/663,059, filed on Jun. 22, 2012, provisional application No. 61/663,811, filed on Jun. 25, 2012.

(51) Int. Cl.
G06F 15/16 (2006.01)
H04L 12/58 (2006.01)

(52) U.S. Cl.
CPC ............... *H04L 51/00* (2013.01); *H04L 51/20* (2013.01)
USPC .......................................... 709/206; 709/203

(58) Field of Classification Search
None
See application file for complete search history.

(56) References Cited

U.S. PATENT DOCUMENTS

| 6,611,687 | B1 | | 8/2003 | Clark et al. | |
|---|---|---|---|---|---|
| 6,823,263 | B1 | * | 11/2004 | Kelly et al. | 702/3 |
| 6,836,730 | B2 | * | 12/2004 | Root et al. | 702/3 |
| 6,845,324 | B2 | * | 1/2005 | Smith | 702/3 |
| 6,944,539 | B2 | | 9/2005 | Yamada et al. | |
| 6,963,853 | B1 | * | 11/2005 | Smith | 705/36 R |
| 6,985,813 | B2 | * | 1/2006 | Root et al. | 702/3 |
| 7,058,510 | B2 | * | 6/2006 | Kelly et al. | 702/2 |
| 7,084,775 | B1 | * | 8/2006 | Smith | 340/601 |
| 7,089,116 | B2 | * | 8/2006 | Smith | 702/3 |
| 7,103,560 | B1 | | 9/2006 | Fox et al. | |
| 7,139,664 | B2 | * | 11/2006 | Kelly et al. | 702/3 |
| 7,181,345 | B2 | * | 2/2007 | Rosenfeld et al. | 702/3 |

(Continued)

FOREIGN PATENT DOCUMENTS

KR 1020070066236 A 6/2007
WO 2009015370 A1 1/2009

OTHER PUBLICATIONS

U.S. Appl. No. 13/646,821, by Philip Hewinson, filed Oct. 8, 2012.

(Continued)

*Primary Examiner* — Ninos Donabed
(74) *Attorney, Agent, or Firm* — Shumaker & Sieffert, P.A.

(57) ABSTRACT

A computing system is described that can automatically provide weather forecast information to a user based on the user's expected future location. In some embodiments, the methods can include predicting a future location of a user and storing the future location in the memory, fetching weather forecast information associated with the future location of the user, and outputting, to a mobile device associated with the user, the weather forecast information associated with the future location of the user.

24 Claims, 10 Drawing Sheets

(56) References Cited

U.S. PATENT DOCUMENTS

| | | | |
|---|---|---|---|
| 7,191,065 B2 * | 3/2007 | Root et al. | 702/3 |
| 7,206,837 B2 | 4/2007 | Seligmann | |
| 7,243,130 B2 | 7/2007 | Horvitz et al. | |
| 7,248,159 B2 * | 7/2007 | Smith | 340/539.13 |
| 7,289,908 B2 * | 10/2007 | Root et al. | 702/3 |
| 7,315,782 B2 * | 1/2008 | Root et al. | 702/3 |
| 7,411,493 B2 * | 8/2008 | Smith | 340/539.18 |
| 7,421,344 B1 * | 9/2008 | Marsh et al. | 702/3 |
| 7,574,661 B2 * | 8/2009 | Matsuura et al. | 715/745 |
| 7,752,188 B2 | 7/2010 | Lagerstedt et al. | |
| 7,813,870 B2 | 10/2010 | Downs et al. | |
| 8,000,888 B2 * | 8/2011 | Kim et al. | 701/117 |
| 8,044,810 B2 | 10/2011 | Delia et al. | |
| 8,264,345 B2 * | 9/2012 | Baron et al. | 340/539.3 |
| 8,306,512 B2 * | 11/2012 | Dixon et al. | 455/414.1 |
| 8,340,830 B2 * | 12/2012 | Hayes et al. | 700/291 |
| 8,457,653 B2 * | 6/2013 | Ledlie | 455/456.1 |
| 8,489,625 B2 * | 7/2013 | Ni et al. | 707/758 |
| 2003/0149609 A1 * | 8/2003 | Kasahara | 705/9 |
| 2004/0064585 A1 * | 4/2004 | Doss et al. | 709/246 |
| 2004/0181340 A1 * | 9/2004 | Smith | 702/3 |
| 2005/0272412 A1 | 12/2005 | Langsenkamp et al. | |
| 2007/0124395 A1 * | 5/2007 | Edge et al. | 709/206 |
| 2009/0076906 A1 * | 3/2009 | Kansal et al. | 705/14 |
| 2009/0077027 A1 * | 3/2009 | King et al. | 707/3 |
| 2009/0192702 A1 | 7/2009 | Bourne | |
| 2010/0151882 A1 * | 6/2010 | Gillies et al. | 455/456.1 |
| 2010/0313149 A1 | 12/2010 | Zhang et al. | |
| 2011/0128144 A1 * | 6/2011 | Baron et al. | 340/539.3 |
| 2011/0165866 A1 * | 7/2011 | Dixon et al. | 455/414.1 |
| 2011/0319064 A1 * | 12/2011 | Lenart et al. | 455/418 |
| 2012/0166565 A1 * | 6/2012 | Hardy et al. | 709/206 |

OTHER PUBLICATIONS

International Search Report and Written Opinion of international application No. PCT/US2013/047177, mailed Feb. 26, 2014, 14 pp.

* cited by examiner

WEATHER FORECASTS BASED ON EXPECTED LOCATION

This application is a Continuation of Application Serial No. PCT/US2013/47177, filed on Jun. 21, 2013 which claims the benefit of U.S. Provisional Application No. 61/663,059, filed Jun. 22, 2012, and U.S. Provisional Application No. 61/663,811, filed Jun. 25, 2012, the entire content of each of which are hereby incorporated by reference.

BACKGROUND

A number of software applications exist that are capable of providing weather forecasts for a user. These applications can be executed using a computer system such as a laptop computer, mobile phone, desktop computer, or tablet computer. These applications can include provisions for a user to search for weather forecasts for various locations.

For example, a user who is planning a trip may search for weather in advance of the trip to obtain a weather forecast for their destination. However, the user must remember to search for the weather forecast and manually performing search queries is cumbersome and time-consuming for the user.

SUMMARY

In one example, a method is provided for generating weather alerts using a computer processor. The method includes predicting a future location of a user and storing the future location in a memory. The method also includes fetching weather forecast information associated with the future location of the user and outputting, e.g., to a mobile device associated with the user, the weather forecast information associated with the future location of the user.

In another example, the method can include collection collecting location data from the mobile device associated with the user, storing the location data in a memory, and analyzing the location data to predict the future location of the user. The location data can include, for example, GPS data. In some examples, the method can include receiving calendar entries associated with the user and analyzing the calendar entries to predict the future location of the user. In other examples, the method can further include receiving user profile data associated with the user and analyzing the user profile data to predict the future location of the user.

In some examples, the method can include receiving, from the mobile device associated with the user, location information indicative of a current location of the user, fetching weather forecast information for the current location of the user, comparing the weather forecast information for the current location with the weather forecast information for the future location to determine differences between the weather forecast information for the current location with the weather forecast information for the future location, and outputting an alert to the mobile device associated with the user based on the determined differences between the weather forecast information for the current location with the weather forecast information for the future location.

In another example, as system is provided for generating weather alerts. The system includes a processor and a memory having instructions stored thereon for execution by the processor. The instructions can include a location prediction module that predicts a future location of a user and stores that future location in a memory, a weather data collection module that fetches weather forecast information associated with the future location of the user, and an output module that outputs the weather forecast information to a mobile device associated with the user.

In one example, the location prediction module can include a historical location data collection module that receives location data from the mobile device associated with the user and stores that location data in a memory. The location prediction module can also include a data processing module that analyzes the location data to predict the future location of the user. For example, the location data can include GPS data.

In further examples, the location prediction module can include a calendar data collection module that receives calendar entries associated with the user and a data processing module that analyzes the calendar entries to predict the future location of the user. In some examples, the location prediction module can include a user profile data collection module that receives user profile data associated with the user and a data processing module that analyzes the user profile data to predict the future location of the user.

In some examples, the instructions can further include a current location data collection module that receives, from the mobile device associated with the user, location data indicative of a current location of the user. In such examples, the weather collection module can fetch weather forecast information for the current location of the user. The instructions can also include a weather comparison module that compares the weather forecast information for the current location with the weather forecast information for the future location and determines at least one difference between the weather forecast information for the current location and the weather forecast information for the future location. The instructions can further include an output module that outputs an alert to the mobile device associated with the user based on the at least one difference between the weather forecast information for the current location and the weather forecast information for the future location.

In another example, a mobile device is provided that includes a processor and a memory having instructions stored thereon for execution by the processor. The instructions can included a location prediction module that predicts a future location of a user and stores that future location in a memory, a weather data collection module that fetches weather forecast information associated with the future location of the user, and an output module that outputs the weather forecast information to the screen of the mobile device.

In some examples, the location prediction module can include a historical location data collection module that collects location data and stores that location data in a memory and a data processing module that analyzes the location data to predict the future location of the user. The location information can include, for example, GPS data. In some embodiments, the location prediction module can include a calendar data collection module that receives calendar entries associated with the user and a data processing module that analyzes the calendar entries to predict the future location of the user. In some examples, the location prediction module can include a user profile data collection module that receives user profile data associated with the user and a data processing module that analyzes the user profile data to predict the future location of the user.

In some examples, the instructions can further include a current location data collection module that collects location data indicative of a current location of the user. In such examples, the weather collection module can fetch weather forecast information for the current location of the user. The instructions can also include a weather comparison module that compares the weather forecast information for the current location with the weather forecast information for the future location and determines at least one difference between the weather forecast information for the current location and the weather forecast information for the future location. The instructions further include an output module that outputs an alert to the screen of the mobile device based on the at least one difference between the weather forecast information for the current location and the weather forecast information for the future location.

The details of one or more examples are set forth in the accompanying drawings and the description below. Other features, objects, and advantages of the disclosure will be apparent from the description and drawings, and from the claims.

DETAILED DESCRIPTION

Techniques are disclosed herein that generally involve automatically providing weather forecast information to a user based on the user's expected future location. In some examples, the user's future location is predicted and weather forecast information for that future location is provided to the user, in many instances decreasing the time and effort required for the user to search for weather forecast information themselves.

Certain examples will now be described to provide an overall understanding of the principles of the structure, function, manufacture, and use of the described techniques. One or more examples are illustrated in the accompanying drawings. Those skilled in the art will understand that the described techniques are non-limiting example. The features illustrated or described in connection with one example may be combined with the features of other examples. Such modifications and variations are intended to be included within the scope of the described techniques.

In situations discussed below in which systems and devices collect or make use of personal information about the user (e.g., search histories, location, etc.) the user may be provided with an opportunity to control whether programs or features of the systems and devices can collect user information (e.g., information about a user's e-mail, a user's social network, social actions or activities, profession, a user's preferences, user's Internet search history, a user's current location, etc.), or to control whether and/or how to the systems and devices may receive content that may be relevant to the user. In addition, certain data may be treated in one or more ways before it is stored or used by the systems and devices, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the systems and devices described herein.

Figure 1:
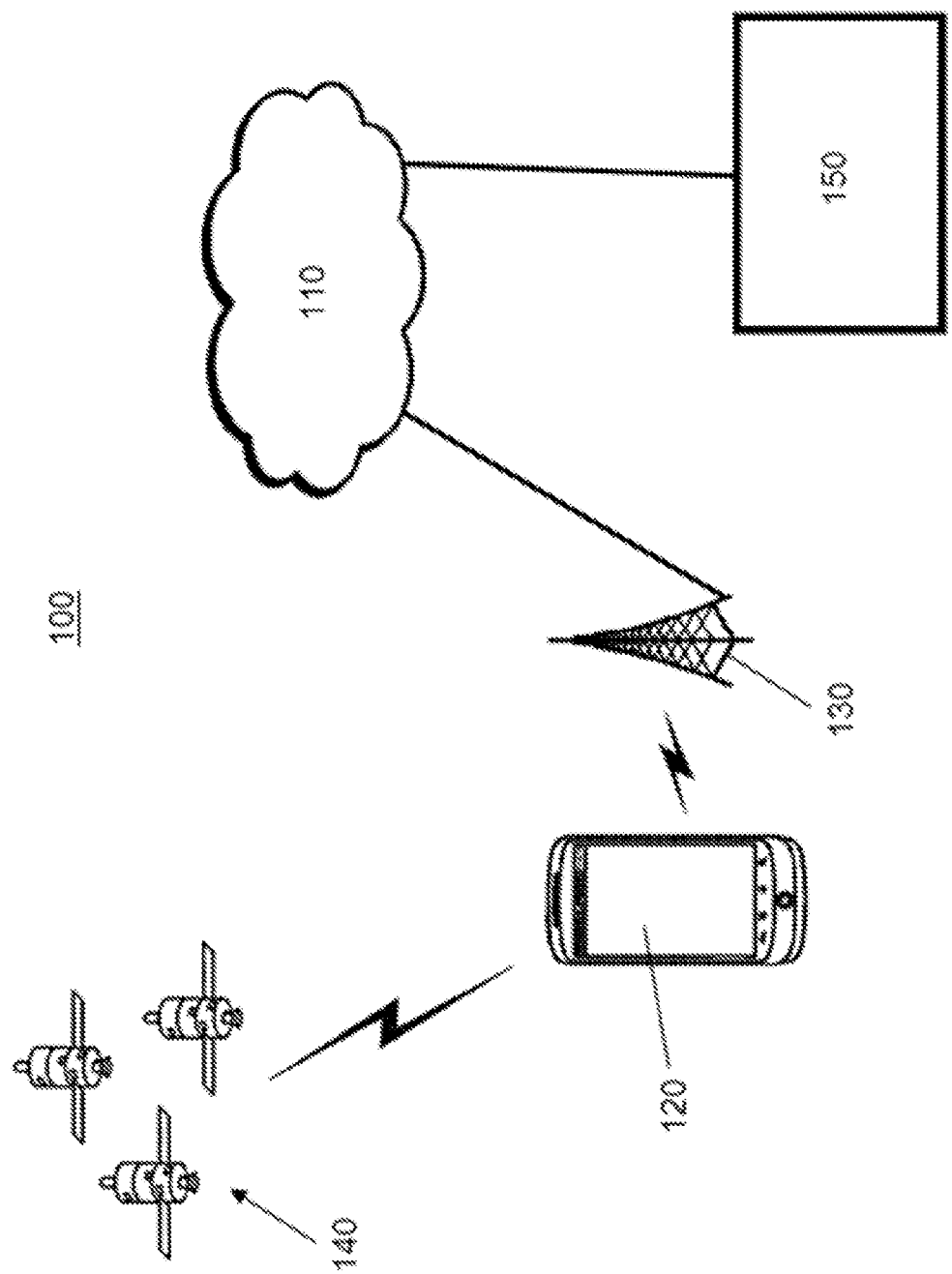
FIG. 1 is a schematic diagram of one example of a mobile network.

FIG. 1 illustrates one example of a mobile network 100 in which one or more of the techniques disclosed herein can be implemented. The mobile network 100 includes a communications network 110 and a mobile device 120. The mobile device 120 can connect to the communications network 110 via various access points 130. Although one mobile device 120 and one access point 130 are illustrated for brevity, the mobile network 100 can include any number of mobile devices and access points.

The mobile device 120 can be or can include any device that is configured to exchange data over the communications network 110, such as a mobile phone, tablet computer, laptop computer, and so forth. The mobile device 120 can also be or can include devices that are not necessarily "mobile," such as desktop computers. The communications network 110 can include any of a variety of networks or combinations of networks, such as GSM, TDMA, CDMA, IEEE 802.11, Bluetooth, Wi-Fi, or any other wired or wireless networks. The access points 130 can be transceivers that provide a gateway between the mobile device 120 and the communications network 110. For example, the access points 130 can be wireless routers or cellular network towers. In some examples, the mobile device 120 can also receive Global Positioning System (GPS) signals transmitted from GPS satellites 140.

In the illustrated example, the mobile network 100 also includes a weather server 150 that can exchange data with the mobile device 120 via the communications network 110. The weather server 150 can be implemented on one or more computer systems (e.g., server computers, personal computers, workstations, mini-computers, clustered computer systems, or embedded computer systems). Some or all of the weather server 150 functionality can also be implemented on the mobile device 120 itself.

Figure 2:
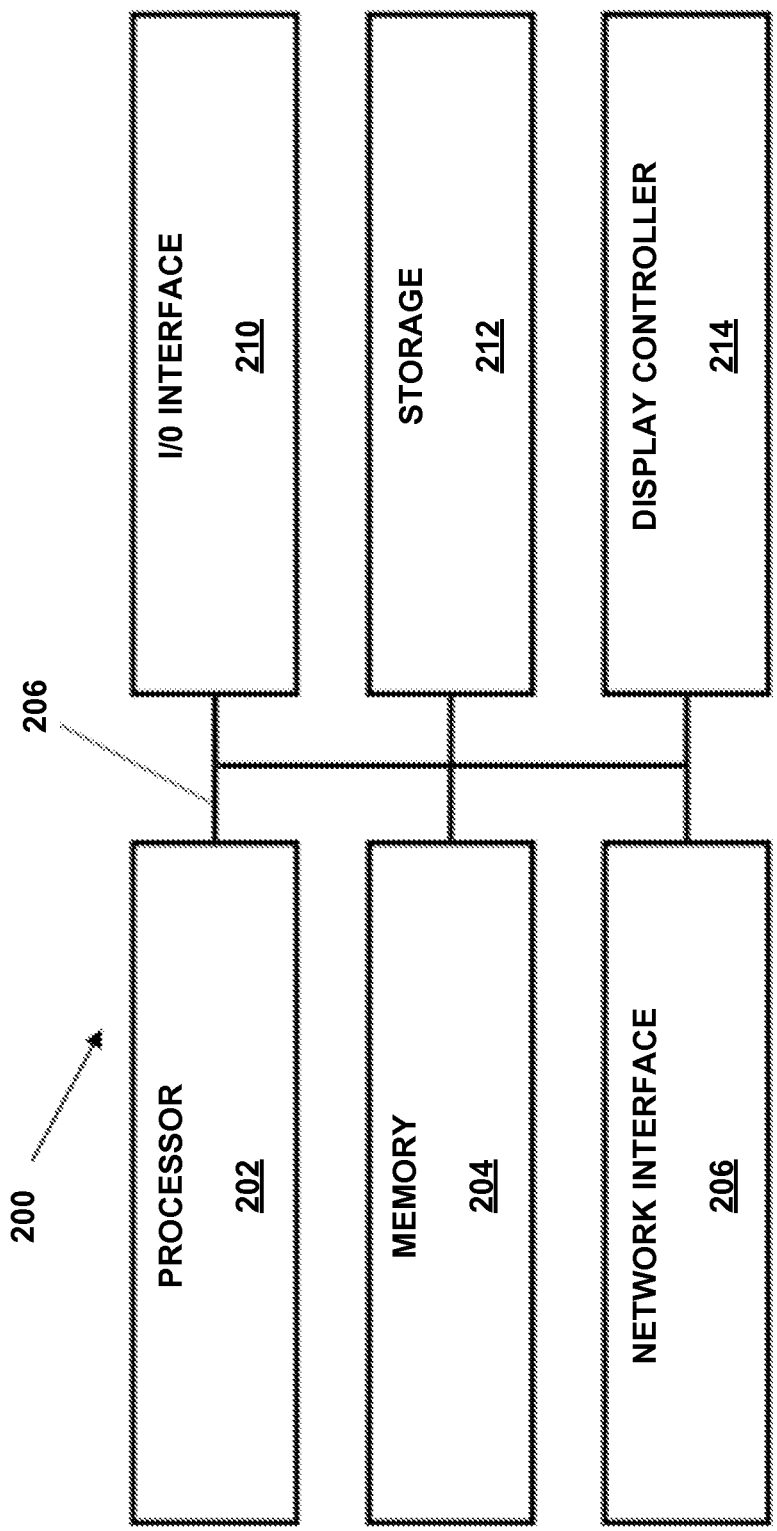
FIG. 2 is a schematic diagram of one example of a computer system.

FIG. 2 illustrates an architecture of a computer system 200 which can be used to implement the mobile device 120 or the weather server 150 of FIG. 1. Although computer system 200 is depicted and described herein, it will be appreciated that this is for sake of generality and convenience. In other examples, the computer system may differ in architecture and operation from that shown and described here.

The illustrated computer system 200 includes a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multiprocessor systems. The computer system 200 also includes a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies. The various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 also includes a network interface 208, an input/output (I/O) interface 210, a storage device 212, and a display controller 214. The network interface 208 enables the computer system 200 to communicate with remote devices (e.g., other computer systems) over a network. The I/O interface 210 facilitates communication between one or more input devices, one or more output devices, and the various other components of the computer system 200. The storage device 212 can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, and/or any combination thereof and can be directly connected to the other components of the computer system 200 or remotely connected thereto, such as over a network. The display controller 214 includes a video processor and a video memory, and generates images to be displayed on one or more displays in accordance with instructions received from the processor 202.

Figure 3:
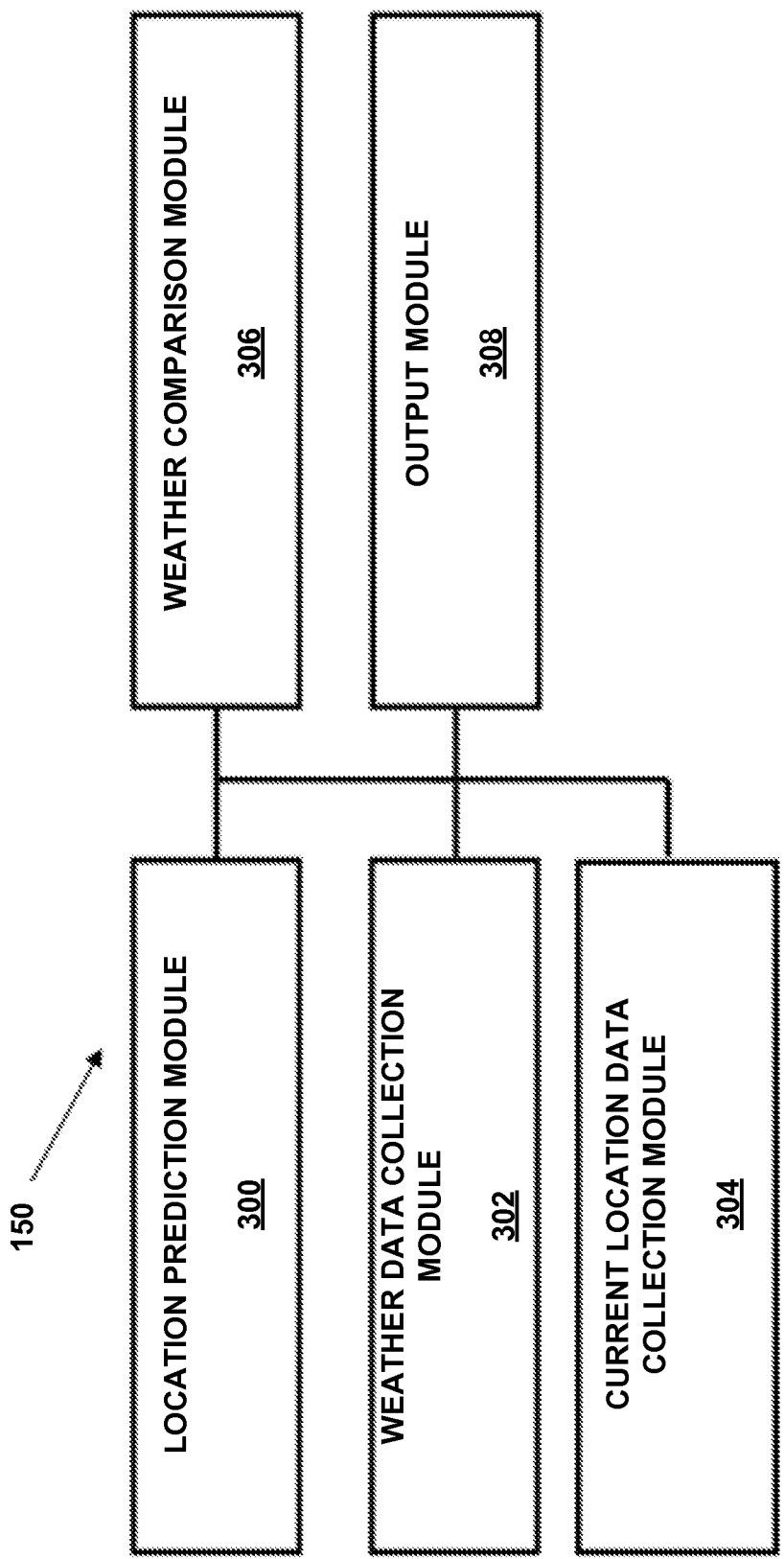
FIG. 3 is a schematic diagram of one example of a weather server.

The various functions performed by the weather server 150 or the mobile device 120 can be logically described as being performed by one or more modules. It will be appreciated that such modules can be implemented in hardware, software, firmware, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the weather server 150 or the mobile device 120 can include fewer or more modules than what is shown and described herein. FIG. 3 is a schematic diagram of the modules of one example of the weather server 150.

In situations described herein, in which modules, devices, and or systems can collect or make use of personal information about the user (e.g., location data), the user may be provided with an opportunity to control whether the programs or features of the modules, devices, and or systems can collect user information or to control whether and/or how the modules, devices, and or systems may receive content that may be relevant to the user. In addition, certain data may be treated in one or more ways before it is stored or used by the modules, devices, and or systems so that personally identifiable information is removed. Thus, the user may have control over how information (e.g., data) about the user's context is collected and used by the modules, devices, and or systems.

As shown in FIG. 3, the weather server 150 can include a location prediction module 300 that predicts a future location of a user. The future location of a user can be predicted in any number of ways. For example, as discussed in more detail below, the location prediction module can include various data collection modules and data processing modules that can predict the future location of a user by collecting and processing data received from the user or the user's mobile device. For example, the future location of the user can be predicted using any one or more of historical location data, calendar entries, emails containing travel reservations (e.g., airline flights, hotel bookings), or other user profile data associated with the user.

Figure 4A:
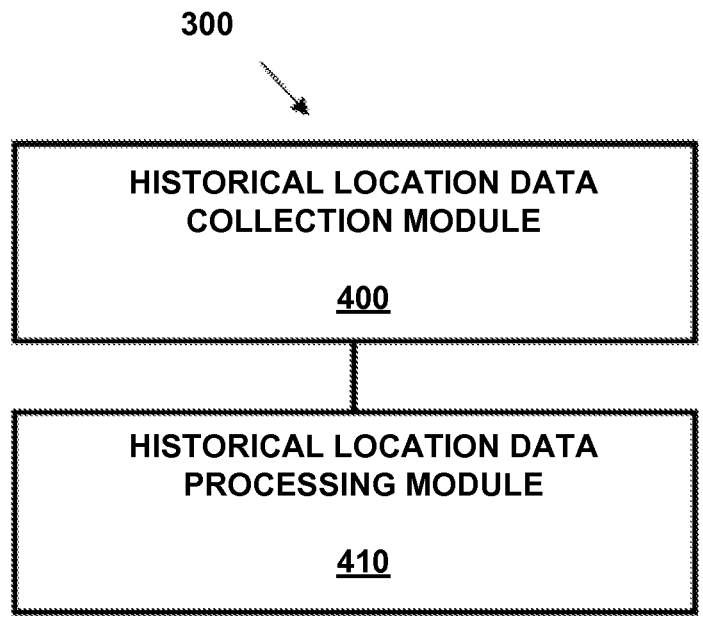
FIG. 4A is a schematic diagram of one example of a location prediction module using historical location data.

In some examples, the location prediction module 300 can use historical location data to predict the future location of a user. In one example, as shown in FIG. 4A, the server 150 can include a historical location data collection module 400 configured to receive location information, e.g., from the mobile device 120, and store that location data in a memory. The location data can be indicative of the current location of the user.

In some instances, the location of a user can be inferred from the location of a mobile device or other object in the user's possession. The user's current location can be determined using various techniques as discussed in more detail below with respect to the processes disclosed herein. For example, location can be determined by processing GPS signals, by detecting proximity to cell towers, Wi-Fi hot spots, or other mobile access points of known location, or by triangulating between the mobile device and a plurality of such access points. The historical location data collection module can also receive the user's current location from other sources, such as when a user "checks in" at a location using any of a number of social applications that provide for such check-ins, when the user indicates their current position by dropping a pin at a particular location or making an equivalent selection using mapping software or when the user responds to a prompt for their current position.

The location data received by the historical location data collection module 400 can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. The location data collection module 400 can also receive raw proximity or other data from the mobile device 120 and can perform any necessary triangulation or location calculations on the server.

In some examples, location information collected by the historical location data collection module 400 can be stored in a memory at various time intervals to provide a location history of the device and the user. This location history can be stored in a cache or other memory on the mobile device, or it can be transmitted to a server over a mobile network and stored in a data store.

Figure 4B:
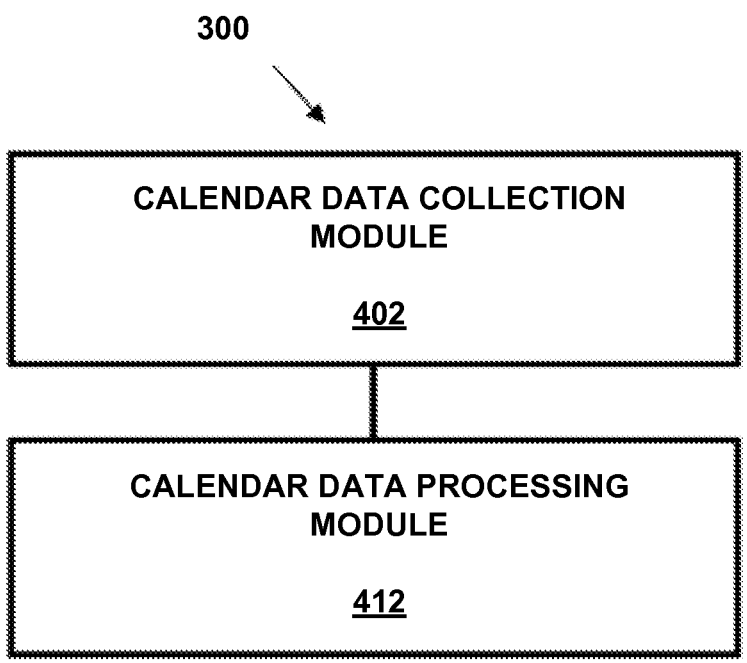
FIG. 4B is a schematic diagram of one example of a location prediction module using calendar data.

In some examples, the location prediction module 300 can use calendar data to predict the future location of a user. In one example, as shown in FIG. 4B, the location prediction module 300 can include a calendar data collection module 402 configured to receive calendar information, e.g., from the mobile device 120 or from other sources such as a calendar application. For example, calendar entries can include the date and time of a future event or meeting along with information associated with the event or meeting. The information associated with the event or meeting can, in some instances, include location information. The location information can be analyzed to identify a geographic location using a process of geocoding, as discussed in more detail below. The geographic location associated with the date and time of the event or meeting can then be used as a prediction of the user's future location at that date and time.

Figure 4C:
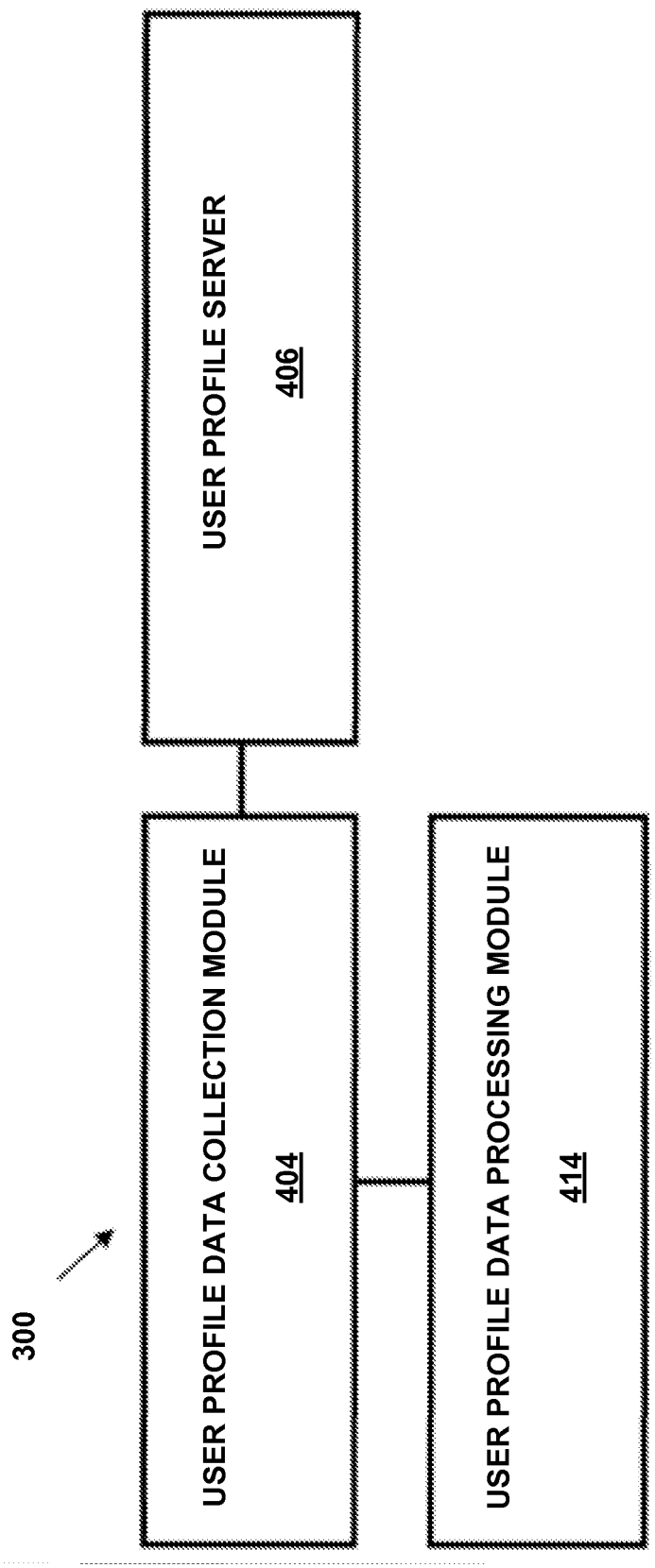
FIG. 4C is a schematic diagram of one example of a location prediction module using user profile data.

In some examples, the location prediction module 300 can include a user profile data collection module that can receive user profile data. In one example, as shown in FIG. 4C, the server 150 can include a user profile data collection module 404 configured to receive user profile data.

In one example, the user profile data collection module 404 can receive user profile data from a user profile server 406. The user profile server 406 maintains user profile data associated with users (e.g., users of the mobile device 120). Portions of the user profile data stored by the user profile server 406 may be manually provided by users or, the user profile data may be automatically inferred or determined, as discussed in more detail below with respect to the processes disclosed herein. In each of the data collection examples discussed above, the location prediction module can also include a data processing module that analyzes the data collected by the various data collection modules to predict the future location of the user. For example, as shown in FIGS. 4A, 4B, and 4C, the location prediction module 300 can include the corresponding data processing modules 410, 412, 414. The data processing modules can analyze the data collected by the data collection modules to predict the future location of the user, as described in more detail below with respect to the processes disclosed herein. It will be appreciated that the location prediction module 300 can include one or more of the modules shown in FIGS. 4A, 4B and 4C in any combination.

Returning to the weather server 150 illustrated in FIG. 3, the weather server 150 can also include a weather data collection module 302 which can be configured to fetch weather forecast information associated with the future location of the user, e.g., as predicted by the location prediction module. For example, the weather data collection module can communicate with a weather database in which weather information is stored. The database can be stored on the server 150, and/or in other locations, such as a cloud-based repository. In some examples, the weather data collection module can communicate with web-based weather sources such as publicly available weather websites. The weather data collection module 302 can execute various operations with respect to the weather database or other weather source, such as reading information from the database or querying the database. For example, the weather data collection module 302 can fetch weather forecast information associated with the future location of the user. The weather forecast information can include various metrics useful to characterize weather conditions such as a textual indication of the weather forecast (e.g., partly cloudy), the forecasted high and low temperatures, wind speed, wind chill, ultra-violet (UV) index, tide levels, air quality, humidity, barometric pressure, extended (e.g. 10-day) forecast information, or any combination thereof. The weather forecast information can also include weather-related warnings for extreme weather events, e.g., blizzard warnings or tornado warnings.

As shown in FIG. 3, the weather server 150 can, in some examples, include a current location data collection module 304 that receives location data, e.g., from the mobile device 120. The location data can be indicative of the current location of the user. The weather collection module 302 can, for example, fetch weather forecast information for the current location of the user. In situations described herein, in which modules, devices, and or systems can collect or make use of personal information about the user (e.g., location data), the user may be provided with an opportunity to control whether the programs or features of the modules, devices, and or systems can collect user information or to control whether and/or how the modules, devices, and or systems may receive content that may be relevant to the user. In addition, certain data may be treated in one or more ways before it is stored or used by the modules, devices, and or systems so that personally identifiable information is removed. Thus, the user may have control over how information (e.g., data) about the user's context is collected and used by the modules, devices, and or systems.

In some instances, the current location of a user can be inferred from the current location of a mobile device or other object in the user's possession. The user's current location can be determined using various techniques, as discussed above with respect to collection of historical location data and as discussed in more detail below with respect to the processes disclosed herein.

The location data received by the current location data collection module 304 can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. The location data collection module 304 can also receive raw proximity or other data from the mobile device 120 and can perform any necessary triangulation or location calculations on the server.

As shown in FIG. 3, the weather server 150 can also include a weather comparison module 306 that compares weather forecast information for the current location with the weather forecast information for the future location. Based on that comparison, the weather comparison module 306 can determine differences between the weather forecast information for the current location and the weather forecast information for the future location. In some examples, the weather comparison module 306 can determine differences between the usual weather at the future location and the weather forecast for the future location. The usual weather can be determined by accessing historical average weather data for that future location for the same time of day and time of year as the expected future visit to that location.

The weather comparison module can compare various weather metrics such as a textual indication of the weather forecast (e.g., partly cloudy), the forecasted high or low temperature, wind speed, wind chill, UV index, air quality, humidity, barometric pressure, or any combination thereof. For example, the weather comparison module can compare the forecasted value for a weather metric at the future location with the value for that weather metric at the current location. For qualitative metrics such as textual indications of the weather forecast, the weather comparison module can identify differences between those textual indications, e.g., cloudy vs. sunny.

Various threshold values can be defined for each quantitative weather metric. These threshold values can be used to determine whether the forecasted value for a weather metric at the future location is significantly different from the current value for that weather metric at the current location. The threshold values can also be used to determine whether the forecasted value for a weather metric at the future location is significantly different from the usual value for that weather metric at the current location. The threshold value can be defined as a percentage difference between the forecast value for a weather metric at the future location and the value for that weather metric at the current location. For example, the threshold value can be defined as a difference of greater than about 20% of the forecasted value for the weather metric at the current location. In other examples, the threshold value can be defined as a difference of greater than about 30% of the forecasted value for the weather metric at the current location.

As shown in FIG. 3, the weather server 150 can also include an output module 308 configured to output weather forecast information. The weather forecast information can be sent as a data transmission via the mobile network 100 to the mobile device 120, which can in turn be configured to display or otherwise present the weather forecast information to the user. For example, the output module 308 can send a text message, email, or push notification to the user's mobile device that includes the weather forecast information. The presentation to the user can also be in a standalone application, a device home screen, a native application, or in any other program executed on the mobile device. For example, outputs generated by the output module 308 can be displayed in an information bar within a mobile application executed on the user's mobile device 120.

The weather forecast information output by the output module 308 can include one or more of an indication of the future location predicted by the location prediction module 300, a time or time range for that future location, and any of a textual indication of the weather forecast (e.g., partly cloudy), a graphical indication of the weather forecast (e.g., cloud icon), the forecasted high and low temperatures, wind speed, wind chill, UV index, tide levels, air quality, humidity, barometric pressure, extended (e.g. 10-day) forecast information, or combinations thereof. A notification might say "it looks like you will be in New York next Tuesday, it will be partly sunny with a high temperature of 40 degrees Fahrenheit."

In some examples, the output module 308 can be configured to output an alert based on a difference between the weather forecast information for the current location and the weather forecast information for the future location. The alert can be triggered by differences between the weather forecast information for the current location and the weather forecast information for the future location that exceed the threshold values discussed above.

The alert can include one or more of an indication of the predicted future location, a time or time range for that future location, and an indication that a weather metric at the future location is significantly different from that weather metric at the current location or from the usual value for that weather metric at the future location. The weather metrics can include any of a textual indication of the weather forecast (e.g., partly cloudy), a graphical indication of the weather forecast (e.g., cloud icon), the forecasted high and low temperatures, wind speed, wind chill, UV index, tide levels, air quality, humidity, barometric pressure, extended (e.g. 10-day) forecast information, or combinations thereof. A notification might say "it looks like you will be in Seattle tomorrow, it will be 10 degrees cooler than your current location."

Figure 5:
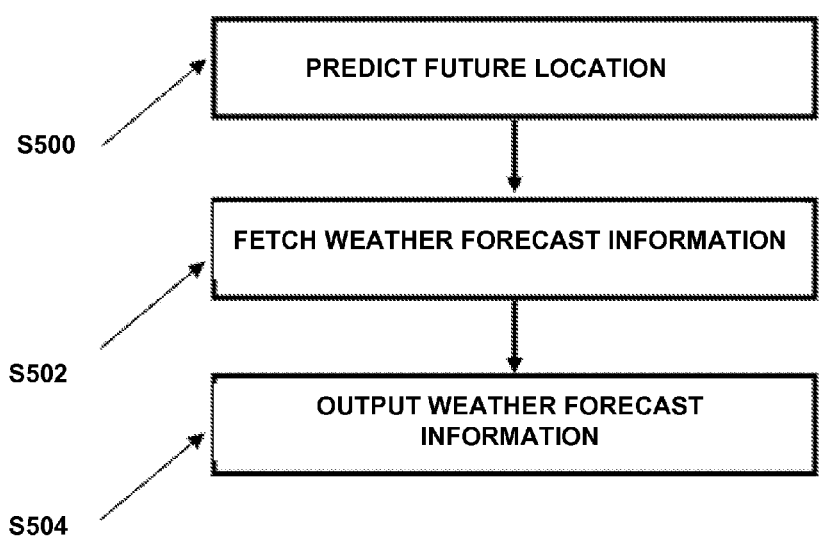
FIG. 5 is a flowchart that schematically depicts example operations for generating weather alerts.

Example operations performed by a computing device, such as computer system 200, for generating weather alerts are illustrated schematically in the flowchart of FIG. 5. While various operations (e.g., processes) disclosed herein may be shown in relation to a flowchart or flowcharts, it should be noted that any ordering of process steps implied by such flowcharts or the description thereof is not to be construed as limiting the process to performing the steps in that order. Rather, the various steps of each of the processes disclosed herein can be performed in any of a variety of sequences. In addition, as the illustrated flowchart(s) are merely examples, various other processes that include additional steps or include fewer steps than illustrated are also within the scope of the described techniques.

Figure 6A:
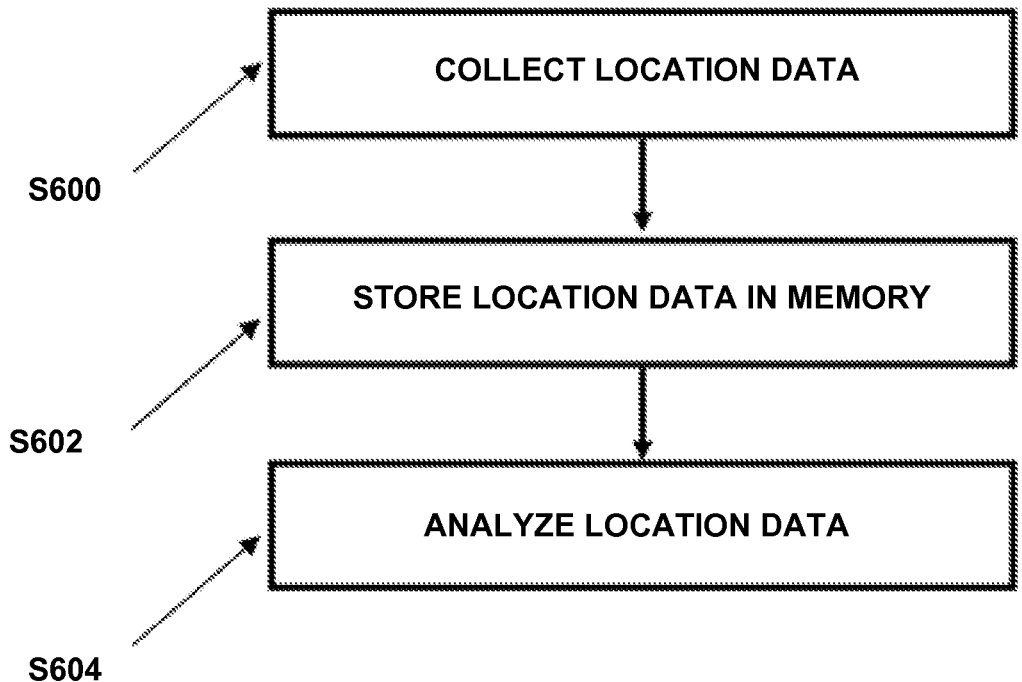
FIG. 6A is a flowchart that schematically depicts example operations for predicting a future location using historical location data.
Figure 6B:
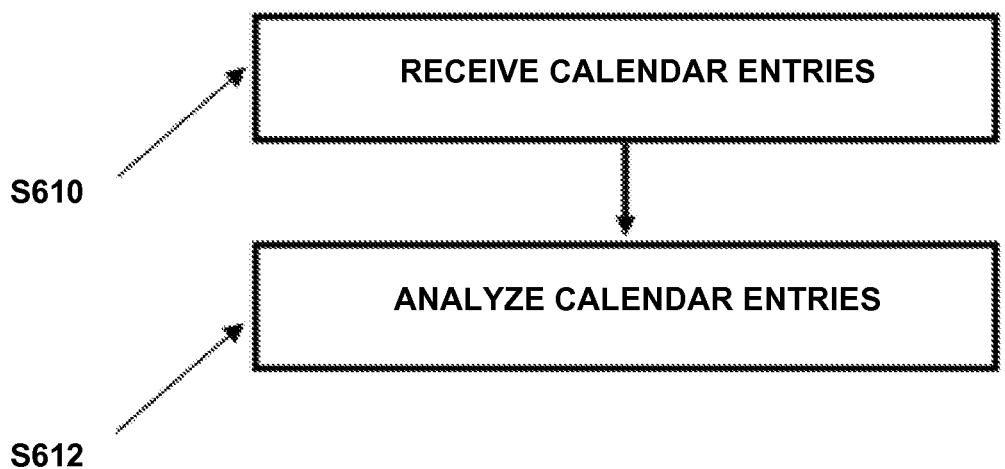
FIG. 6B is a flowchart that schematically depicts example operations for predicting a future location using calendar data.
Figure 6C:
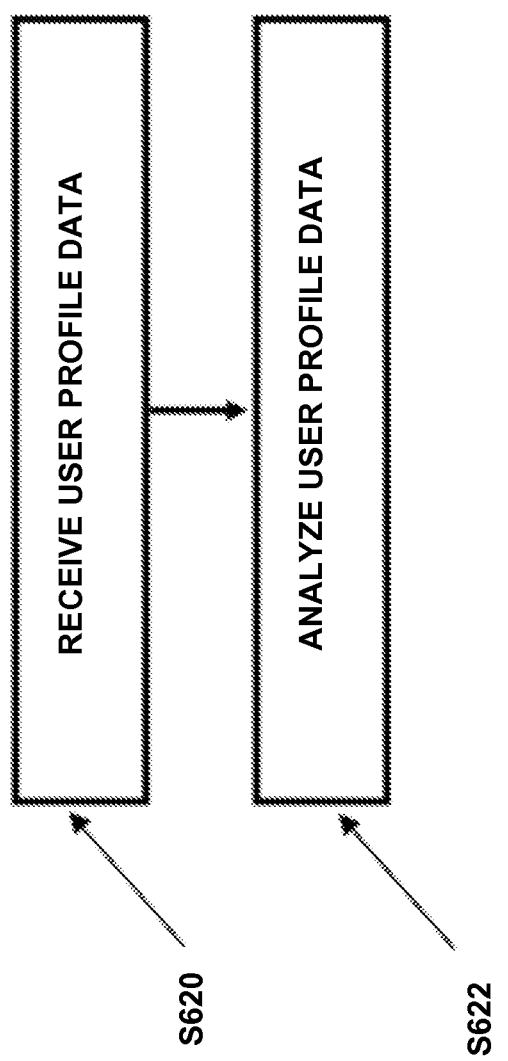
FIG. 6C is a flowchart that schematically depicts example operations for predicting a future location using user profile data.

The process illustrated in FIG. 5, which in some examples can be executed by the weather server 150, begins at step S500 where a user's future location is predicted and stored in a memory. The user's future location can be predicted using various operations, such as those operations which are illustrated in the flowcharts of FIGS. 6A, 6B, and 6C. It will be appreciated that the user's future location can be predicted using any of these operations in any combination.

In one example, a user's future location can be predicted using historical location data collected, for example, from the mobile device 120. As illustrated schematically in the flowchart of FIG. 6A, the process can include a step S600 of collecting location data from the mobile device associated with the user, storing the location data in a memory at step S602, and analyzing the location data, using a processor coupled to the memory, to predict the future location of the user at step S604. The location data can be indicative of the current location of the user. In situations described herein, in which modules, devices, and or systems can collect or make use of personal information about the user (e.g., location data), the user may be provided with an opportunity to control whether the programs or features of the modules, devices, and or systems can collect user information or to control whether and/or how the modules, devices, and or systems may receive content that may be relevant to the user. In addition, certain data may be treated in one or more ways before it is stored or used by the modules, devices, and or systems so that personally identifiable information is removed. Thus, the user may have control over how information (e.g., data) about the user's context is collected and used by the modules, devices, and or systems.

As discussed above, the location of a user can, in some instances, be inferred from the location of a mobile device or other object in the user's possession. In the example shown in FIG. 1, the mobile device 120 can be configured to periodically communicate its current location to the server 150 using the mobile network 100. This can occur several times per minute, once per minute, once per hour, or at any other regular or sporadic time interval. The mobile device 120 can determine or estimate its current location using any of a variety of known techniques, such as by processing GPS signals, by detecting proximity to cell towers, Wi-Fi hot spots, or other mobile access points 130 of known location, or by triangulating between the mobile device 120 and a plurality of such access points 130. In some examples, a computer program for obtaining a user's current location may be used that provides the best estimate of a user's location using a number of onboard or server-based sources (called location providers).

The user's current location can also be inferred from other sources, such as when a user "checks in" at a location using any of a number of social applications that provide for such check-ins, when the user indicates their current position by dropping a pin at a particular location or making an equivalent selection using mapping software, or when the user responds to a prompt for their current position.

The location data can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. Raw proximity or other data from the mobile device 120 can also be received by the server and any necessary triangulation or location calculations can be performed on the server.

In some examples, the collected location information can be stored in a memory at various time intervals to provide a location history of the device and the user. This location history could be stored in a cache or other memory on the mobile device, or it could be transmitted to a server over a mobile network and stored in a data store. The process of FIG. 6A continues at step S604, in which the location history data can be analyzed to predict a future location of the user. Various algorithms can be used to analyze the historical location data.

For example, the location history data can be analyzed to identify patterns in the location history. Predictions of future locations can then be made using the identified patterns. In some instances, the location history data can be analyzed to generate a probabilistic model of where the user is likely to be at given times. For example, if the historical location data indicates that the user often visits beach locations on weekends during the summer, then a prediction can be made that the user will visit a beach location on a future summer weekend.

In some examples, the location data can be processed to obtain additional information corresponding to a geographic location, such as an address or a business name associated with that location. For example, processes known as geocoding and reverse geocoding can be used to convert location from geographic coordinates to human-readable addresses. Geocoding refers to a process in which into a human-readable address, e.g., 1600 Amphitheatre Parkway, Mountain View, Calif., can be converted to location data in geographic coordinates, e.g., latitude 37.423021 and longitude −122.083739. Reverse geocoding refers to the reverse process, i.e., converting geographic coordinates into an address.

In another example, a user's future location can be predicted using calendar data associated with the user. As illustrated schematically in the flowchart of FIG. 6B, the process can include a step S610 of receiving calendar entries associated with the user and, at step S612, analyzing the calendar entries, using a processor coupled to a memory, to predict the future location of the user.

For example, calendar entries can include the date and time of a future event or meeting along with information associated with the event or meeting. The information associated with the event or meeting can, in some instances, include location information. The location information can be analyzed to identify a geographic location using a process of geocoding, as discussed above. The geographic location associated with the date and time of the event or meeting can then be used as a prediction of the user's future location at that date and time.

In another example, a user's future location can be predicted using user profile data associated with the user. As illustrated schematically in the flowchart of FIG. 6C, the process can include a step S620 of receiving user profile data associated with the user and, at step S622, analyzing the user profile data calendar entries, using a processor coupled to a memory, to predict the future location of the user.

The user profile data can, in some examples, be received from a user profile server that maintains user profile data associated with users (e.g., users of the mobile device 120). Portions of the user profile data stored by the user profile server 406 may be manually provided by users or, the user profile data may be automatically inferred or determined.

For example, device users may enter demographic information such as age, gender, marital status, income, level of education, and the like, using a device application configured to provide data to profile server 406 or some intermediary system. In some implementations, one or more items of user profile data may be inferred based on usage, such as device, application, and/or content usage. For example, a user profile may be generated based on such factors as application management (e.g., dates and times of purchase, installation, deletion, and upgrade), and based on various application acquisition processes (purchasing, downloading of trial versions, downloading of free versions and the like) and application categories (e.g., sports, travel, finance, and the like).

In some examples, user profile data may be heuristically determined. For instance, if a particular user primarily uses sporting and financial applications, it may be inferred that the user is associated with one particular demographic group over another. User profile data may be stored in a user profile maintained on the user profile server 406. The profile server 406 may, for example, associate provided or inferred demographic information with a particular user or user device.

In some cases, the user profile can include location data. For example, location data may be provided to the user profile server by mobile devices that can determine or estimate a current location using any of a variety of known techniques, such as by processing GPS signals, or by detecting proximity to cell towers that incorporate location sensing technology. Location data also may be explicitly provided by a user, e.g., such as when a user "checks in" at a location using any of a number of social applications that provide for such check-ins, when the user indicates their current position by dropping a pin at a particular location or making an equivalent selection using mapping software, or when the user responds to a prompt for their current position. In some examples, location data (and/or other demographic data) may be inferred, based at least in part on one or more installed applications. For example, the relevance of particular applications may be determined to be linked, at least in part, to one or more locations or regions. For instance, an application for locating restaurants may be preferred by users of a particular demographic in London, and another application for locating restaurants may be preferred by users of a similar demographic in Paris.

Device-based data may also be used to generate user profile data. For example, when the user agrees to provide such information, interaction data (e.g., data related to phone calls, messages, e-mails, and the like) may be used to augment data that may be included in the corresponding user's profile. In some examples, the time and frequency of communications may be used as factors, e.g. to identify a pattern of usage from which data may be extracted, such as to infer whether the user frequently travels internationally. In some examples, social interaction data (e.g., data related to one or more people involved in such communications) may be used. As another example, device usage data may be used in generating user profile data. For example, data related to the time and frequency of use of particular device peripherals (e.g., cameras, headphones, and the like), and applications (e.g., media players, installed applications, and the like) may be used. A user determined to frequently use device headphones and a media player and to occasionally use text messaging during a particular time period (e.g., from 8:00-8:30 AM, Monday through Friday) may be identified as a likely commuter who uses mass transportation.

The user profile data can be analyzed to predict future locations of the user. For example, the user profile data can be analyzed to identify locations often visited by the user and when those locations are visited. Predictions of future locations can then be made using the locations often visited by the user and the times when those locations were visited. In some instances, the user profile data can be analyzed to generate a probabilistic model of where the user is likely to be at given times.

The user profile can also be analyzed to identify user interests that correlate with future locations or a certain class of locations. For example, if the user profile data indicates that the user engages in outdoor activities on weekends, then a prediction can be made that weather forecast information for the weekend might be of interest to the user. For another example, if the user profile data indicates that the user often goes skiing during the winter, then a prediction can be made that the user will visit ski resorts in the future and that weather forecasts for snow accumulation might be of interest to the user.

In situations discussed in which information is collected or analyzed to obtain a user profile about the user (e.g., search histories, location, etc.) the user may be provided with an opportunity to control whether programs or features of the systems and devices can collect user information (e.g., information about a user's e-mail, a user's social network, social actions or activities, profession, a user's preferences, user's Internet search history, a user's current location, etc.), or to control whether and/or how to the systems and devices may receive content that may be relevant to the user. In addition, certain data may be treated in one or more ways before it is stored or used by the systems and devices, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the systems and devices described herein.

Returning to the flowchart of FIG. 5, the process continues at step S502 which includes fetching weather forecast information associated with the future location of the user. For example, as illustrated in FIG. 3, the weather server 150 can include a weather data collection module 302 which can be configured to fetch weather forecast information associated with the future location of the user, e.g., as predicted by the location prediction module 300. The weather data collection module can also be configured to fetch weather forecast information associated with the user's interests, e.g., as determined by analysis of user profile data.

In some examples, the weather data collection module can communicate with a weather database in which weather information is stored. The database can be stored on the server 150, and/or in other locations, such as a cloud-based repository. In some examples, the weather data collection module can communicate with web-based weather sources or other publicly available weather websites. The weather data collection module 302 can execute various operations with respect to the weather database or other weather source, such as reading information from the database or querying the database. For example, the weather data collection module 302 can fetch weather forecast information associated with the future location of the user. The weather forecast information can include various metrics useful to characterize weather conditions such as a textual indication of the weather forecast (e.g., partly cloudy), the forecasted high and low temperatures, wind speed, wind chill, UV index, tide levels, air quality, humidity, barometric pressure, extended (e.g. 10-day) forecast information, or any combination thereof. The weather forecast information can also include weather-related warnings for extreme weather events, e.g., blizzard warnings or tornado warnings.

Figure 7:
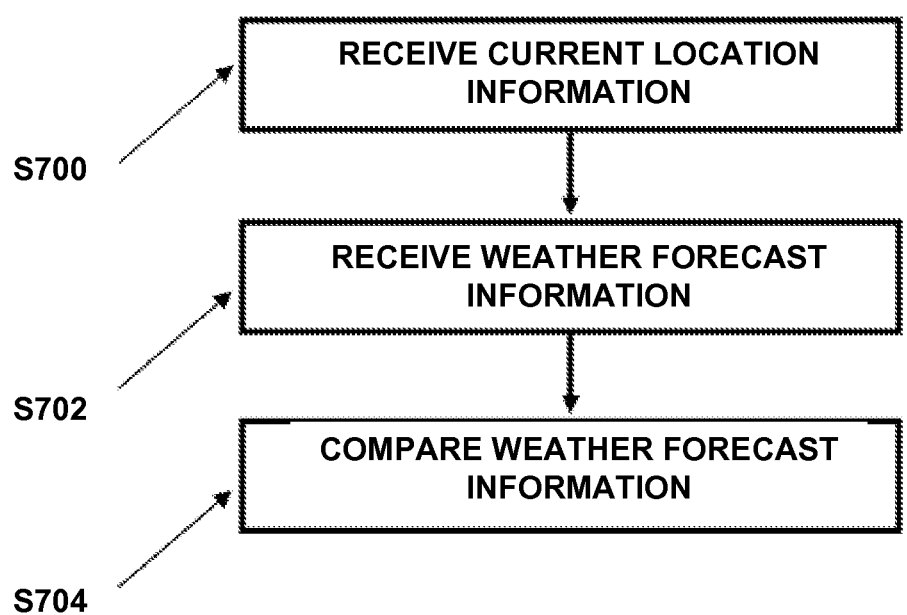
FIG. 7 is a flowchart that schematically depicts example operations for comparing a weather forecast.

In some examples, the process can optionally include a comparison between the weather forecast for a current location of the user with the weather forecast for a predicted future location of the user and outputting an alert to the mobile device associated with the user based on differences between the weather forecast for the current location with the weather forecast for the future location. For example, as illustrated in the flowchart of FIG. 7, the process can include a step S700 in which location information indicative of the current location of the user is received, e.g., from the mobile device associated with the user.

As discussed above, the mobile device can be configured to periodically communicate its current location to the server using a mobile network. This can occur several times per minute, once per minute, once per hour, or at any other regular or sporadic time interval. The mobile device can determine or estimate its current location using any of a variety of known techniques, such as by processing GPS signals, by detecting proximity to cell towers, Wi-Fi hot spots, or other mobile access points of known location, or by triangulating between the mobile device and a plurality of such access points.

The process continues at step S702, in which weather forecast information for the current location of the user is fetched, e.g., from a weather database in which weather information is stored. The database can be stored on the server, and/or in other locations, such as a cloud-based repository. In some examples, the weather forecast information can be fetched from web-based weather sources or other publicly available weather websites. The weather forecast information can include various metrics useful to characterize weather conditions such as a textual indication of the weather forecast (e.g., partly cloudy), the forecasted high and low temperatures, wind speed, wind chill, UV index, tide levels, air quality, humidity, barometric pressure, extended (e.g. 10-day) forecast information, or any combination thereof. The weather forecast information can also include weather-related warnings for extreme weather events, e.g., blizzard warnings or tornado warnings.

The process continues at step S704, which includes comparing weather forecast information for the current location with weather forecast information for the future location. Based on that comparison, differences can be determined between the weather forecast information for the current location and the weather forecast information for the future location. Step 406 can also include comparing weather forecast information for the future location with the usual weather for that location at the future date and time. Based on such a comparison, differences can be determined between the weather forecast information for the future location and the usual weather for that location.

Various weather metrics can be compared such as a textual indication of the weather forecast (e.g., partly cloudy), the forecasted high or low temperature, wind speed, wind chill, UV index, air quality, humidity, barometric pressure, or any combination thereof. For example, the forecasted value for a weather metric at the future location can be compared with the value for that weather metric at the current location. For qualitative metrics such as textual indications of the weather forecast, differences between those textual indications can be identified, e.g., cloudy vs. sunny.

Various threshold values can be defined for each quantitative weather metric. These threshold values can be used to determine whether the forecasted value for a weather metric at the future location is significantly different from the current value for that weather metric at the current location. The threshold values can also be used to determine whether the forecasted value for a weather metric at the future location is significantly different from the usual value for that weather metric at the current location. The threshold value can be defined as a percentage difference between the forecast value for a weather metric at the future location and the value for that weather metric at the current location. For example, the threshold value can be defined as a difference of greater than about 20% of the forecasted value for the weather metric at the current location. In other examples, the threshold value can be defined as a difference of greater than about 30% of the forecasted value for the weather metric at the current location.

Returning to the flowchart of FIG. 5, the process continues at step S504 which includes outputting weather forecast information, e.g., to a mobile device associated with the user. The weather forecast information can include one or more of an indication of the predicted future location, a time or time range for that future location, and any of a textual indication of the weather forecast (e.g., partly cloudy), the forecasted high and low temperatures, wind speed, wind chill, UV index, tide levels, air quality, humidity, barometric pressure, extended (e.g. 10-day) forecast information, or combinations thereof. A notification might say "it looks like you will be in New York next Tuesday, it will be partly sunny with a high temperature of 40 degrees Fahrenheit."

In some examples, the weather forecast information output can include an alert based on a difference between the weather forecast information for the current location and the weather forecast information for the future location. The alert can be triggered by differences between the weather forecast information for the current location and the weather forecast information for the future location that exceed the threshold values discussed above.

In some examples, the weather forecast information output can include an alert based on a difference between the weather forecast information for the current location and the usual weather for the future location. The alert can be triggered by differences between the weather forecast information for the future location and the usual weather forecast information for that location at the same time of day and year as the expected future visit to that location.

The alert can include one or more of an indication of the predicted future location, a time or time range for that future location, an indication that a weather metric at the future location is significantly different from that weather metric at the current location or from the usual value for that weather metric at the future location. The weather metrics can include any of a textual indication of the weather forecast (e.g., partly cloudy), a graphical indication of the weather forecast (e.g., cloud icon), the forecasted high and low temperatures, wind speed, wind chill, UV index, tide levels, air quality, humidity, barometric pressure, extended (e.g. 10-day) forecast information, or combinations thereof A notification might say "it looks like you will be in Seattle tomorrow, it will be 10 degrees cooler than your current location." Another notification might say "it looks like you will be in Los Angeles tomorrow, it will be raining and 15 degrees cooler than the usual weather this time of year."

In some examples, the weather forecast information output can include an alert based on a weather forecast information associated with the user's interests, e.g., as determined by analysis of user profile data. The alert can be triggered by the approach of a time period associated with the user interest or by weather forecast information associated with the user interest. For example, if analysis of user profile data indicates that the user often engages in outdoor activities on weekends, then an alert can be triggered on a Thursday that provides weather forecast information for the weekend. Examples of such notifications might be "it will be 70 degrees and sunny this weekend," or "a snow storm is forecast for the mountains this weekend." For another example, if analysis of user profile data indicates that the user often goes sailing during the summer months, then an alert can be triggered that provides a forecast wind, tide and temperature for the following day. Examples of such a notification might be "low tide is at 9:00 am tomorrow, the temperature will be 65 degrees with a strong northeast wind." In some examples, some or all of the functionality disclosed above as being performed by the weather server 150 can instead be performed by the mobile device 120.

Figure 8:
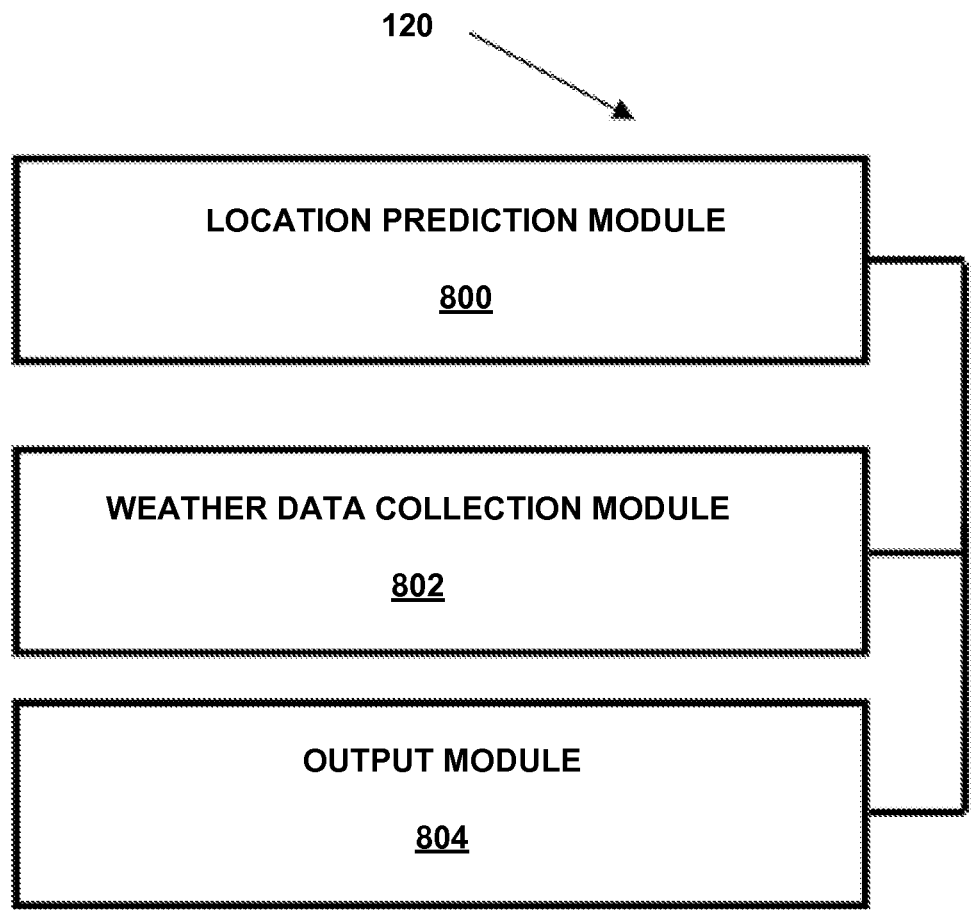
FIG. 8 is a schematic diagram of another example of a mobile device.

FIG. 8 is a schematic diagram of the modules of a mobile device for use in one such example. The structure and function of the mobile device illustrated in FIG. 8 is substantially similar to that of the weather server of FIG. 3, except as noted herein and as will be readily apparent to those having ordinary skill in the art. Accordingly, a detailed description thereof is omitted here for the sake of brevity.

As shown in FIG. 8, the mobile device can include a location prediction module 800 configured to predict a future location of a user associated with the mobile device and store that future location in a memory. The mobile device can also include a weather collection module 802 configured to fetch weather forecast information associated with the future location of the user and an output module 804 that outputs the weather forecast information, for example on a display screen of the mobile device. The prediction module 800 can include various modules substantially similar to those discussed above with respect to the weather server 150 of FIG. 3 for predicting the future location using historical location data, calendar entries, or other user profile data associated with the user. The mobile device can also include a current location collection module and weather comparison module as discussed above with respect to the weather server 150 of FIG. 3. These various modules can function in the same manner as those disclosed above with respect to the weather server 150, except that data stored or produced by a remote server (e.g., user profile databases) can be accessed by those modules using one or more calls to a remote server, for example using the mobile network 100.

In some examples, the location prediction module can include a historical location data collection module that collects location data and stores that location data in a memory and a data processing module that analyzes the location data to predict the future location of the user. The location information can include, for example, GPS data. In some embodiments, the location prediction module can include a calendar data collection module that receives calendar entries associated with the user and a data processing module that analyzes the calendar entries to predict the future location of the user. In some examples, the location prediction module can include a user profile data collection module that receives user profile data associated with the user and a data processing module that analyzes the user profile data to predict the future location of the user.

In some examples, the instructions can further include a current location data collection module that collects location data indicative of a current location of the user. In such examples, the weather collection module can fetch weather forecast information for the current location of the user. The instructions can also include a weather comparison module that compares the weather forecast information for the current location with the weather forecast information for the future location and determines at least one difference between the weather forecast information for the current location and the weather forecast information for the future location. The instructions further include an output module that outputs an alert to the screen of the mobile device based on the at least one difference between the weather forecast information for the current location and the weather forecast information for the future location.

In some examples, a computing system may receive one or more communications associated with a user of a computing device. The computing system may predict, based on the one or more communications, a future location of the user at a future time. The computing system may receive weather forecast information for the future location at the future time. The computing system may send, to the computing device, prior to the future time, the weather forecast information associated with the future location of the user.

In some examples, when predicting the future location of the user at the future time the computing system may identify recurring locations from a location history associated with the user and determine, based on the recurring locations, a travel pattern associated with the user. The computing system may predict, based on the travel pattern, the future location of the user at the future time.

In some examples, when predicting the future location of the user at the future time the computing system may identify, based on a calendar entry associated with the user, a time of an event and a location of the event, and may determine that the future location of the user corresponds to the location of the event and that the future time corresponds to the time of the event.

In some examples, when predicting the future location of the user at the future time the computing system may identify, based on the one or more communications of the user, a time of an event and a location of the event, and may determine that the future location of the user corresponds to the location of the event and that the future time corresponds to the time of the event.

In some examples, the computing system may receive average weather forecast information for the future location over a period of time, and determine one or more differences between the average weather forecast information for the future location and the weather forecast information for the future location at the future time. Responsive to determining that the one or more differences satisfy a threshold, the computing system may send, to the computing device, information indicative of the one or more differences (e.g., a notification).

In some examples, the computing system may determine a current location of the computing device at a current time, and may predict, based on the current location of the computing device at the current time, the future location of the user at the future time.

In some examples, the computing system may receive weather forecast information for a current location of the computing device at a current time, and determine one or more differences between the weather forecast information for the current location at the current time with the weather forecast information for the future location at the future time. Responsive to determining that the one or more differences satisfy a threshold, the computing system may send, to the computing device, information indicative of the one or more differences.

In some examples, a computing system may determine, based on the one or more communications, a predicted interest of the user, and may predict, based at least in part on the predicted interest of the user, the future location and the future time. Responsive to determining that the predicted interest includes one or more outdoor activities, the computing system may send, to the computing device, information indicative of the weather forecast information associated with the future location of the user.

In some examples, a computing device may send, to a computing system, a location history associated with a user of the computing device. Responsive to sending the location history to the computing system, the computing device may receive, from the computing system, an indication of a predicted future location of the user at a future time. The predicted future location may be based at least in part on one or more communications associated with the user. The computing device may receive an indication of an input corresponding to a command to present information predicted to be of interest to the user, and responsive to receiving the input, the computing device may output, for display, an indication of weather forecast information for the predicted future location of the user at the future time.

In some examples, responsive to sending the location history to the computing system, the computing device may receive, from the computing system, prior to the future time, information indicative of an outdoor activity associated with the predicted future location, wherein the information indicative of the outdoor activity includes the indication of the weather forecast information for the predicted future location at the future time, and may output, for display, a graphical indication indicative of the outdoor activity and the weather forecast information.

In some examples, the computing device may receive, from the computing system, prior to the future time, information (e.g., an alert, a notification, etc.) indicative of a difference between a metric associated with the weather forecast information for the predicted future location and a corresponding metric associated with current weather forecast information for a current location associated with the computing device exceeds a threshold. Responsive to receiving the information indicative of the difference, the computing device may output, for display, a graphical indication of the information indicative of the difference.

In some examples, the computing device may receive, from the computing system, prior to the future time, information indicative of a difference between a metric associated with the weather forecast information for the predicted future location and a corresponding metric associated with average weather forecast information for the predicted future location at the future time exceeds a threshold. Responsive to receiving the information indicative of the difference, the computing device may output, for display, a graphical indication of the information indicative of the difference.

Although the techniques have been described by references to specific examples, it should be understood that numerous changes may be made within the spirit and scope of the concepts described. Accordingly, it is intended that the techniques not be limited to the described examples, but that the techniques have the full scope defined by the language of the following claims.

What is claimed is:

1. A method comprising:
    receiving, by a computing system, one or more communications associated with a user of a computing device, the one or more communications including information comprising at least one of an e-mail associated with the user, a phone call associated with the user, a message associated with the user, or social interaction data associated with the user;

determining, by the computing system, based at least in part on a location history of the computing device and the one or more communications, a future location and a future time at which the user is predicted to engage in an outdoor activity;

determining, by the computing system, one or more differences between an average weather forecast for the future location over a period of time and a predicted weather forecast for the future location at the future time; and responsive to determining that at least one of the one or more differences satisfies a threshold, automatically sending, by the computing system, to the computing device, notification data comprising an indication of the predicted weather forecast.

2. The method of claim 1, wherein determining the future location and the future time further comprises:

identifying, by the computing system, recurring locations from a location history associated with the user;

determining, by the computing system, and based on the recurring locations, a travel pattern associated with the user; and determining, by the computing system, based on the travel pattern, the future location and the future time.

3. The method of claim 1, wherein determining the future location and the future time further comprises:

identifying, by the computing system, based on a calendar entry associated with the user, a time of an event associated with the outdoor activity and a location of the event; and determining, by the computing system, that the future location corresponds to the location of the event and that the future time corresponds to the time of the event.

4. The method of claim 1, wherein determining the future location and the future time further comprises:

identifying, by the computing system, based on the one or more communications, a time of an event associated with the outdoor activity and a location of the event; and determining, by the computing system, that the future location of the user corresponds to the location of the event and that the future time corresponds to the time of the event.

5. The method of claim 1, wherein determining the future location and the future time further comprises:

determining, by the computing system, a current location of the computing device at a current time; and determining, by the computing system, based on the current location of the computing device at the current time, the future location and the future time.

6. The method of claim 1, further comprising:

receiving, by the computing system, current weather forecast for a current location of the computing device at a current time;

determining, by the computing system, at least one difference between the current weather forecast for the current location at the current time with the predicted weather forecast for the future location at the future time; and responsive to determining that the at least one difference satisfies the threshold, automatically sending, by the computing system, to the computing device, the notification data, wherein the notification data further comprises information indicative of the at least one difference.

7. The method of claim 1, wherein the one or more communications include at least one e-mail communication including information indicative of a travel reservation of the user.

8. A method comprising:

sending, by a computing device, to a computing system, a location history associated with a user of the computing device;

responsive to sending the location history to the computing system, automatically receiving, by the computing device, from the computing system, notification data comprising a predicted weather forecast for a predicted future location of the user at a future time, wherein the predicted future location of the user at the future time is determined based at least in part on the location history and one or more communications associated with the user that indicate that the user is predicted to engage in an outdoor activity at the predicted future location of the user at the future time and that at least one difference between the predicted weather forecast for the predicted future location at the future time and an average weather forecast for the predicted future location over a period of time satisfies a threshold, the one or more communications comprising at least one of an e-mail associated with the user, a phone call associated with the user, a message associated with the user, or social interaction data associated with the user;

receiving, by the computing device, an indication of an input corresponding to a command to present information predicted to be of interest to the user; and responsive to receiving the input, outputting, by the computing device and for display, an indication of the outdoor activity and the predicted weather forecast.

9. The method of claim 8, further comprising:

receiving, by the computing device, from the computing system, prior to the future time, information indicative of a difference between a metric associated with the predicted weather forecast for the predicted future location and a corresponding metric associated with a current weather forecast for a current location associated with the computing device exceeds the threshold; and responsive to receiving the information indicative of the difference, automatically outputting, by the computing device, for display, a graphical indication of the information indicative of the difference.

10. The method of claim 8, further comprising:

receiving, by the computing device, from the computing system, prior to the future time, information indicative of a difference between a metric associated with the predicted weather forecast for the predicted future location and a corresponding metric associated with the average weather forecast exceeds the threshold; and responsive to receiving the information indicative of the difference, automatically outputting, by the computing device, for display, a graphical indication of the information indicative of the difference.

11. A computing system comprising:

at least one processor; and at least one module operable by the at least one processor to:

receive one or more communications associated with a user of a computing device, the one or more communications comprising at least one of an e-mail associated with the user, a phone call associated with the user, a message associated with the user, or social interaction data associated with the user;

determine, based at least in part on a location history of the computing device and the one or more communications, a future location and a future time at which the user is predicted to engage in an outdoor activity; and determining, by the computing system, one or more differences between an average weather forecast for the future location over a period of time and a predicted weather forecast for the future location at the future time;

responsive to determining that at least one of the one or more differences satisfies a threshold, automatically send, to the computing device, notification data comprising an indication of the predicted weather forecast.

12. The computing system of claim 11, wherein the at least one module is further operable by the at least one processor to determine the future location and the future time by:

identifying recurring locations from a location history associated with the user;

determining, based on the recurring locations, a travel pattern associated with the user; and determining, based on the travel pattern, the future location and the future time.

13. The computing system of claim 11, wherein the at least one module is further operable by the at least one processor to determine the future location and the future time by:

identifying, based on a calendar entry associated with the user, a time of an event associated with the outdoor activity and a location of the event; and determining that the future location corresponds to the location of the event and that the future time corresponds to the time of the event.

14. The computing system of claim 11, wherein the at least one module is further operable by the at least one processor to determine the future location and the future time by:

identifying, based on the one or more communications, a time of an event associated with the outdoor activity and a location of the event; and determining, that the future location corresponds to the location of the event and that the future time corresponds to the time of the event.

15. The computing system of claim 11, wherein the at least one module is further operable by the at least one processor to determine the future location and the future time by:

determining a current location of the computing device at a current time; and determining, based on the current location of the computing device at the current time, the future location and the future time.

16. The computing system of claim 11, wherein the at least one module is further operable by the at least one processor to:

receive a current weather forecast for a current location of the computing device at a current time;

determine at least one difference between the current weather forecast for the current location at the current time with the predicted weather forecast for the future location at the future time; and responsive to determining that the at least one difference satisfies the threshold, automatically send, to the computing device, the notification data, wherein the notification data further comprises information indicative of the at least one difference.

17. The computing system of claim 11, wherein the one or more communications include at least one e-mail including information indicative of travel reservations of the user.

18. A computing device comprising:
a display device;
an input device;
at least one processor; and
at least one module operable by the at least one processor to:

send, to a computing system, a location history associated with a user of the computing device;

responsive to sending the location history to the computing system, automatically receive, from the computing system, notification data comprising a predicted weather forecast for a predicted future location of the user at a future time, wherein the predicted future location of the user at the future time is determined based at least in part on the location history and one or more communications associated with the user that indicate that the user is predicted to engage in an outdoor activity at the predicted future location of the user at the future time and that at least one difference between the predicted weather forecast for the predicted future location at the future time and an average weather forecast for the predicted future location over a period of time satisfies a threshold, the one or more communications comprising at least one of an e-mail associated with the user, a phone call associated with the user, a message associated with the user, or social interaction data associated with the user;

receive an indication of an input detected at the input device, the input corresponding to a command to present information predicted to be of interest to the user; and responsive to receiving the input, output, for display at the display device, an indication of the outdoor activity and the predicted weather forecast.

19. The computing system of claim 18, wherein the at least one module is further operable by the at least one processor to:

receive, from the computing system, prior to the future time, information indicative of a difference between a metric associated with the predicted weather forecast for the predicted future location and a corresponding metric associated with current weather forecast for a current weather forecast for a current location associated with the computing device exceeds the threshold; and responsive to receiving the information indicative of the difference, automatically output, for display at the display device, a graphical indication of the information indicative of the difference.

20. The computing system of claim 18, wherein the at least one module is further operable by the at least one processor to:

receive, from the computing system, prior to the future time, information indicative of a difference between a metric associated with the predicted weather forecast for the predicted future location and a corresponding metric associated with the average weather forecast exceeds the threshold; and responsive to receiving the information indicative of the difference, automatically output, for display at the display device, a graphical indication of the information indicative of the difference.

21. The method of claim 1, further comprising:
determining, by the computing system, based on historical weather data for the future location and at least one of a same time of day as the future time or a same time of year as the future time, the average weather forecast.

22. The method of claim 21, wherein the historical weather data is average weather data for the future location and the at least one of the same time of day as the future time or the same time of year as the future time.

23. The computing system of claim 11, wherein the at least one module is further operable by the at least one processor to determine, based on historical weather data for the future location and at least one of a same time of day as the future time or a same time of year as the future time, the average weather forecast.

24. The computing system of claim 23, wherein the historical weather data is average weather data for the future location and the at least one of the same time of day as the future time or the same time of year as the future time.

\* \* \* \* \*